No. 775,007. PATENTED NOV. 15, 1904.
F. C. HOCKENSMITH.
MINE CAR.
APPLICATION FILED JUNE 15, 1904.
NO MODEL.

Witnesses
Lindsay deB Little
Robert P. Hutchinson

Inventor
F. C. Hockensmith
By J.W. Nesbit
Atty.

No. 775,007.

Patented November 15, 1904.

UNITED STATES PATENT OFFICE.

FRANKLIN C. HOCKENSMITH, OF PITTSBURG, PENNSYLVANIA, ASSIGNOR TO HOCKENSMITH WHEEL & MINE CAR COMPANY, OF PENN STATION, PENNSYLVANIA, A CORPORATION OF PENNSYLVANIA.

MINE-CAR.

SPECIFICATION forming part of Letters Patent No. 775,007, dated November 15, 1904.

Application filed June 15, 1904. Serial No. 212,622. (No model.)

*To all whom it may concern:*

Be it known that I, FRANKLIN C. HOCKENSMITH, a citizen of the United States, residing at Pittsburg, in the county of Allegheny and State of Pennsylvania, have invented certain new and useful Improvements in Mine-Cars, of which the following is a specification, reference being had therein to the accompanying drawings.

This invention relates to a mine-car, and more particularly to the truck thereof; and one object is to so construct the truck as to prevent the car-bottom from sagging under heavy loads and bending the axles.

A further object is to constitute the truck a practically rigid frame and to so interlock the truck and car-bottom that shocks and jolts incident to dumping and other hard usage are communicated to and to a great extent borne by the car-bottom, whereby the truck and the bolts securing the same to the car-bottom are relieved of much of the wear and distorting strains to which they are ordinarily subjected.

The invention has for a further object to provide for maintaining the parallel relation of the axles.

Figure 1:
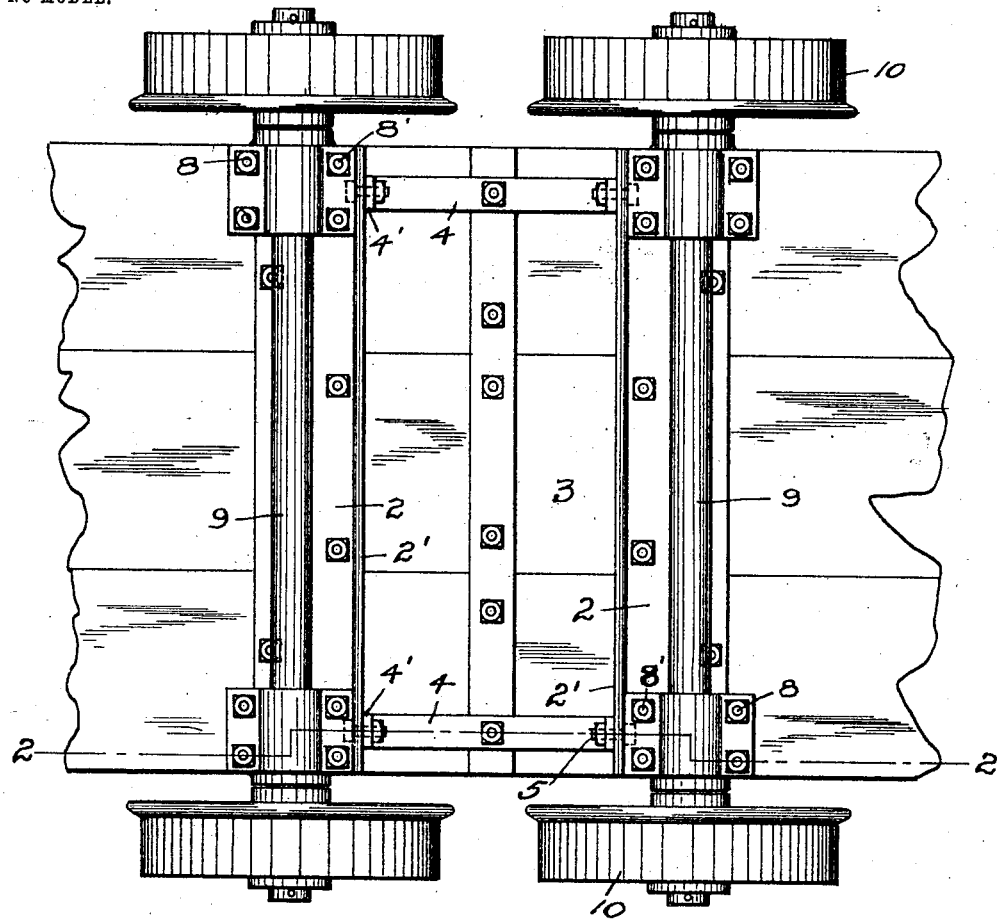
Figure 2:
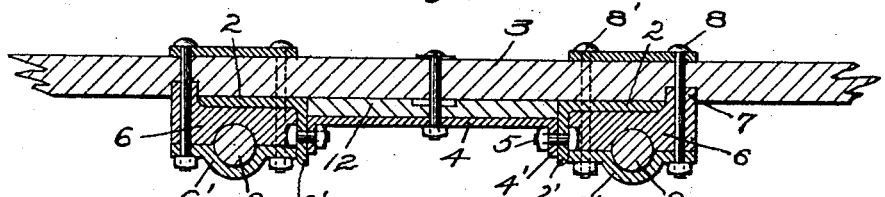
Figure 3:
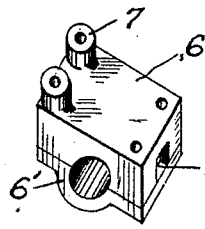

In the accompanying drawings, Figure 1 is an inverted plan view of the improved truck and a portion of the floor of a car. Fig. 2 is a longitudinal sectional view taken on line 2 2 of Fig. 1. Fig. 3 is a detail view of one of the axle-boxes.

In the present embodiment of the invention two parallel angle-bars 2 are employed which traverse the under side of the car floor or bottom 3 and which are arranged in reverse positions or with their depending angles 2' facing each other. The bars are preferably connected at opposite ends by straps 4, the extremities 4' thereof being turned downward to receive bolts 5, which secure them to angles 2'.

Fitting within the ends of angle-bars 2 are axle-securing devices, here shown embodied in boxes 6, which are somewhat wider than the bars and have upwardly-projecting lugs 7, which enter corresponding depressions in floor 3. These depressions are laterally inclosed or closed on all sides, or, in other words, they have continuous side walls, and hence it is impossible for the parts thus united to shift laterally with relation to each other in any direction so long as the interlocking engagement is maintained. The boxes are preferably apertured through these lugs to pass securing-bolts 8, while similar bolts 8' extend through the floor and the overlapping portions of the angle-bars and boxes. The axles 9 are beneath and parallel with bars 2 and extend through boxes 6, with the track-wheels 10 mounted on their projecting extremities. With this construction it is impossible for the floor to sag under heavy loads and bend the axles.

The inner or adjacent sides of boxes 6 are formed each with a depression 11 to receive the head of bolt 5, which is thus held from turning, and with the nut thereof confined in the angle formed by the bent end 4' of strap 4 it is absolutely impossible for the bolt to loosen.

A wood fillet 12 is interposed between bottom 3 and strap 4, placing the latter directly in line with boxes 6 at each side of the car and directly bracing them one against the other, thus making an absolutely rigid truck-frame.

With angle-bars 2 arranged back to back and rigidly connected in line with the axle-boxes and with the latter fitting the angles of the bars and also interlocking with the car-bottom shocks received at either end of the car are communicated to and resisted by the entire truck-frame and the car-bottom. The securing-bolts 8 8' are relieved of much of the strain which they would receive in the absence of the interlocking construction, and, furthermore, the described arrangement maintains the axles in parallel relation. The wheels on each side of a mine-car are quite close together, and a double-acting brake (not shown, but well known in the art) is arranged between and serves for both wheels; but the absolutely rigid truck-frame prevents the braking pressure from forcing the wheels apart and disturbing the parallel relation of the axles.

While I here show boxes 6 constructed with removable cap-bottoms 6' for confining the axles, the latter may be variously held, and it is obvious that the invention may be changed or modified in various ways without departing from the scope thereof as defined by the appended claims.

I claim as my invention—

1. In a mine-car, the combination of the car-bottom, and a truck, one of said parts having openings closed on all sides, and the other part having integral projections which interlock with such openings, whereby the bottom and truck are held against lateral movement or displacement in any direction.

2. In a mine-car, the floor thereof having bottom openings closed on all sides, and a truck having integral projections adapted to enter and be embraced on all sides by the openings.

3. In a mine-car, the floor thereof having laterally-inclosed bottom openings, a truck having apertured projections adapted to enter and be embraced on all sides by the openings, and securing-bolts extending through the floor and the apertured projections.

4. In a mine-car, the floor thereof having bottom openings closed on all sides, axle-boxes having integral projections on their upper sides adapted to enter and be embraced on all sides by the openings, and means for securing the boxes.

5. A mine-car having angle-bars traversing the bottom thereof, axle-securing devices fitting the angles of the bars and projecting over the latter, and a connection between the projecting portions of said devices and the car-bottom.

6. A mine-car having angle-bars traversing the bottom thereof, axle-securing devices fitting the bars and projecting beyond the open sides of the latter, and projections on said devices adapted to enter depressions in the car-bottom.

7. A mine-car having angle-bars traversing the bottom thereof, axle-securing devices fitting the angle-bars and wider than the latter, apertured projections on the upper sides of said devices, and securing-bolts extending through the car-bottom and said apertures.

8. A mine-car having angle-bars traversing the bottom thereof and arranged back to back, a cross connection between the backs of said bars, axle-securing devices fitting the angle-bars, and axles.

9. In a mine-car having angle-bars traversing the bottom thereof and arranged back to back, straps connecting the backs of the bars, bolts for maintaining said connection, and axle-securing devices fitting the angle-bars and formed with depressions to embrace the heads of said bolts.

10. A mine-car having bars traversing the under side thereof, axle-holding devices secured to and projecting beyond said bars, and interlocking connections between the projecting portions of said devices and the car-bottom.

11. A mine-car having angle-bars traversing the bottom thereof and arranged back to back, connecting-straps interposed between the bar-backs and having their ends turned downward, bolts extending through the bar-backs and the turned extremities of said straps with the bolt-nuts fitting the angles formed by the bends of said straps, and axle-boxes fitting the angle-bars and formed with depressions to receive the heads of said bolts.

In testimony whereof I affix my signature in presence of two witnesses.

FRANKLIN C. HOCKENSMITH.

Witnesses:
DAVID M. WAGONER,
CYRUS F. BILHMIER.